United States Patent [19]

Okada et al.

[11] Patent Number: 4,795,666
[45] Date of Patent: Jan. 3, 1989

[54] FIBER REINFORCED STRUCTURAL MEMBER

[75] Inventors: Yukio Okada, Amagasaki; Akira Iwamura; Shuji Akashi, both of Kobe, all of Japan

[73] Assignee: Kawasaki Jukogyo Kabushiki Kaisha, Kobe, Japan

[21] Appl. No.: 49,054

[22] Filed: May 12, 1987

[30] Foreign Application Priority Data

May 12, 1986 [JP] Japan .................................. 61-109308

[51] Int. Cl.[4] ........................... B32B 3/12; B32B 3/26
[52] U.S. Cl. ........................................ 428/71; 428/72;
52/DIG. 7; 52/DIG. 8; 52/727; 52/309.4;
52/309.7; 52/309.9; 52/309.11
[58] Field of Search ................... 428/72, 71, 178, 182;
52/DIG. 8, DIG. 7, 727, 309.4, 309.7, 309.9,
309.11

[56] References Cited

U.S. PATENT DOCUMENTS

| 3,246,058 | 4/1966 | Voelker ............................... 52/309.7 |
| 3,331,173 | 7/1967 | Elsner ................................. 52/309.11 |
| 3,331,174 | 7/1967 | Wesch et al. ...................... 52/309.11 |

FOREIGN PATENT DOCUMENTS 154387 12/1975 Japan .
195646 12/1982 Japan .

Primary Examiner—Alexander S. Thomas
Attorney, Agent, or Firm—Schwartz & Weinrieb

[57] ABSTRACT

A fiber reinforced structural member comprises a shell element formed of a fiber reinforced material such as, for example, a fiber reinforced plastic, and a core element having a large joining surface fixedly joined to the inner surface of the shell element, and comprising one or a plurality of primary core elements each formed of a fiber reinforced material such as, for example, a fiber reinforced plastic, in the form of a tube or a channel, and internally filled with a filling material such as, for example, foam polyurethane. Since the shell element and the core element are joined together over the large joining area, an external force applied to the fiber reinforced structural member is distributed over the large joining surface and hence the stress in the joining surface is reduced, so that the durability and reliability of the fiber reinforced structural member is enhanced.

26 Claims, 2 Drawing Sheets

FIBER REINFORCED STRUCTURAL MEMBER

FIELD OF THE INVENTION

The present invention relates to a lightweight structural member having sufficient rigidity and strength and, more specifically, to a fiber reinforced structural member.

BACKGROUND OF THE INVENTION

Fiber reinforced plastics (hereinafter abbreviated to "FRPs") are well-known fiber reinforced materials. Various fibers including glass fibers and carbon fibers have been developed for use in FRPs. These fibers have a strength equivalent to or greater than those of steels. Thus, FRP structural members are capable of replacing reliable steel structural members and various FRPs have been applied to structural members for supporting loads.

On the other hand, since the specific gravity of FRPs, in general, is on the order of one-fifth the specific gravity of steels, the application of FRP structural members to construction structures effectively reduces the total weight of the structures.

FIG. 1 shows a beam member, an exemplary structural member to which the present invention pertains, comprising an elongate beam body 1 formed of a FRP, bearing pads 2 and 3 attached to the opposite ends of the beam body 1, respectively, and a load bearing part 4 provided at the middle of the beam body 1 for supporting an external load. When the beam body 1 supported at the opposite ends thereof is loaded in the middle portion thereof, the bending moment is large in the middle portion and small at the end portions. Since the elastic modulus of such a fiber reinforced plastic structural member is 1/20 to 1/5 that of steels, ordinarily, the beam body 1, namely, the structural member, is provided with an internal reinforcement so as to tend to uniformly distribute the bending stress throughout the section thereof.

FIG. 7 illustrates an exemplary conventional structural member provided with an internal reinforcement. This structural member comprises a beam body 1 having a rectangular cross section, a reinforcing plate 5 formed of the same material as the beam body 1 and provided inside the beam member 1, and a filling material 6 such as, for example, foam polyurethane, filling the inner space of the beam body 1. In this structural member, however, since the reinforcing plate 5 is joined along the narrow side edges thereof to the inner surface of the beam body 1, the strength of the junctions is not large enough to withstand tensile forces and shearing forces which act on the junctions, and hence such a conventional structural member is not satisfactory in reliability.

OBJECTS OF THE INVENTION

It is therefore an object of the present invention to provide a fiber reinforced structural member formed of a fiber reinforced material having many advantages as mentioned above and which can eliminate the drawbacks of the conventional fiber reinforced structural member through the application of simple and rational means.

It is another object of the present invention to provide a fiber reinforced structural member comprising a shell element, and a core element or elements having a large joining area joined to the shell element so that the junctions of the shell element and the core element or elements are strong enough to withstand tensile forces and shearing forces which act on the junctions.

SUMMARY OF THE INVENTION

In one aspect of the present invention, a fiber reinforced structural member comprises: a shell element formed of a fiber reinforced material and having a closed cross section; and a core element fixedly joined to the inner surface of the shell element, and formed by uniting a plurality of elongate primary core elements each formed of a fiber reinforced material, having a closed cross section or a channel-shaped cross section and internally filled with a filling material.

In another aspect of the present invention, a fiber reinforced structural member comprises: a shell element formed of a fiber reinforced material and having a closed cross section; and a core element fixedly joined to the inner surface of the shell element, and comprising an elongate primary core element formed of a fiber reinforced material, having a closed cross section or a channel-shaped cross section and internally filled with a first filling material, and a second filling material joined to one side surface of the elongate primary core element.

BRIEF DESCRIPTION OF THE DRAWINGS

The above and other objects, features and advantages of the present invention will become more apparent from the following description taken in conjunction with the accompanying drawings, in which.

DESCRIPTION OF THE PREFERRED EMBODIMENTS

Figure 1:
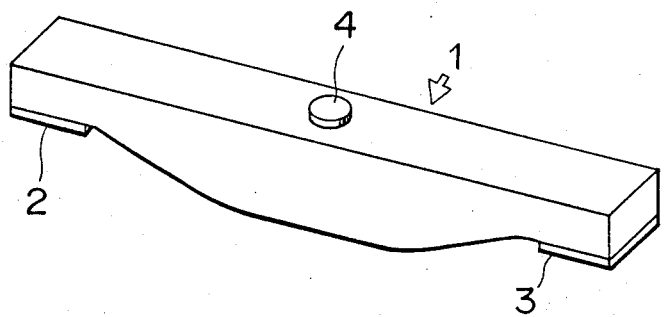
FIG. 1 is a perspective view of a structural member to which the present invention pertains.
Figure 2:
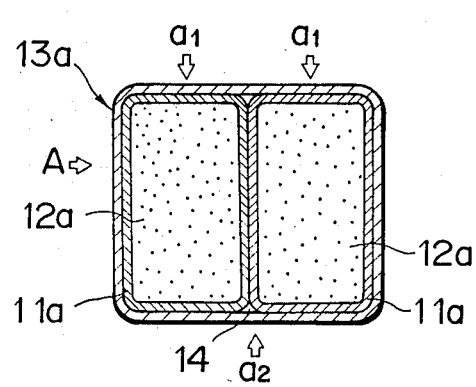
FIGS. 2, 3 and 4 are sectional views of fiber reinforced structural members in first, second and third embodiments, respectively, according to the present invention.

First Embodiment (FIG. 2)

Referring to FIG. 2, a fiber reinforced structural member A comprises a shell element 13a having a closed cross section and formed of a fiber reinforced material such as, for example, a FRP, and a core element $a_2$ provided inside the shell element 13a in surface contact with and fixedly joined over the entire contact surface thereof to the shell element 13a. The core element $a_2$ comprises two primary core elements $a_1$ each formed by filling a filling material 12a such as, for example, foam polyurethane, in a hollow elongate core member 11a having a rectangular cross section and formed of a fiber reinforced material such as, for example, a FRP. The two primary core elements $a_1$ are united together to form the core element $a_2$. Gaps formed between the outer surface of the core element $a_2$ and the inner surface of the shell element 13a are filled with the same resin 14 as that of the FRP forming the shell element 13a. The resin is applied to the outer surface of the core element $a_2$ before inserting the core element $a_2$ into the shell element 13a.

Figure 3:
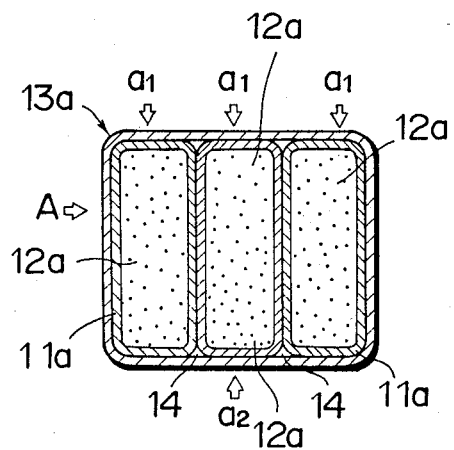

Second Embodiment (FIG. 3)

In FIG. 3, parts similar to those previously described with reference to FIG. 2 are denoted by the same reference characters.

Basically, the second embodiment is similar to the first embodiment in construction. In the second embodiment, a core element $a_2$ is constructed by uniting three primary core elements $a_1$, which are the same in construction as the primary core elements $a_1$ of the first embodiment.

Figure 4:
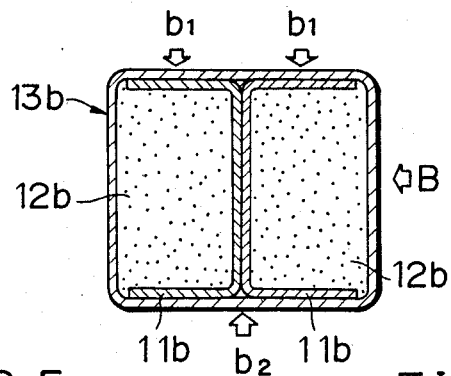

Third Embodiment (FIG. 4)

A fiber reinforced structural member B, in a third embodiment, according to the present invention comprises: a shell element $13b$ formed of a fiber reinforced material such as, for example, a FRP, and having a closed cross section; and a core element $b_2$ constructed by uniting, in a back-to-back fashion, two primary core elements $b_1$ each formed by filling a filling material $12b$ such as, for example, foam polyurethane, in an elongate channel-shaped core member $11b$. The shell element $13b$ and the core element $b_2$ are fixedly joined over the entire contact surfaces thereof.

Figures 5, 6:
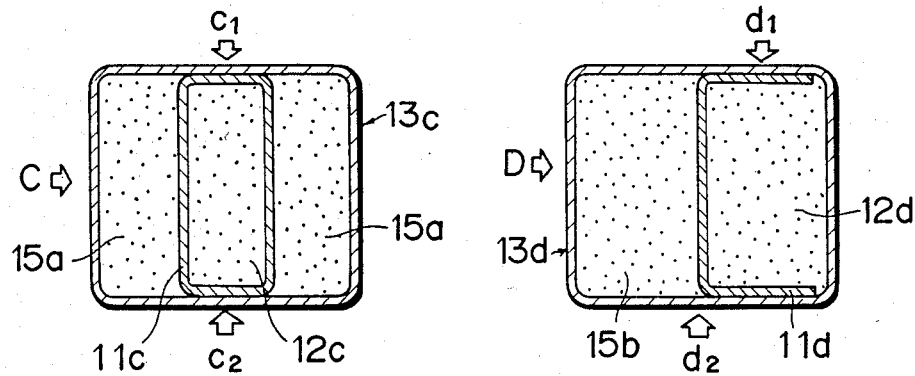
FIGS. 5 and 6 are sectional views of fiber reinforced structural members in fourth and fifth embodiments, respectively, according to the present invention.
Figure 7:
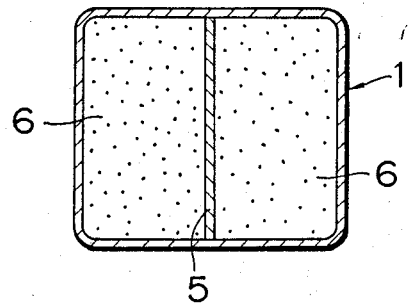
FIG. 7 is a sectional view of a conventional fiber reinforced structural member.

Fourth Embodiment (FIG. 5)

A fiber reinforced structural member C, in a fourth embodiment, according to the present invention comprises: a shell element $13c$ formed of a fiber reinforced material such as, for example, a FRP, and having a closed cross section; and a core element $c_2$ comprising a primary core element $c_1$ formed by filling a filling material $12c$ such as, for example, foam polyurethane, in a hollow elongate core member $11c$ formed of a fiber reinforced material such as, for example, a FRP, and having a rectangular cross section, and filling strips $15a$ formed of a resin such as, for example, foam polyurethane, attached to the opposite sides of the primary core element $c_1$, respectively. The core element $c_2$ is inserted into the interior of the shell element $13c$, and then the core element $c_2$ and the shell element $13c$ are firmly joined over the entire contact surface thereof.

Fifth Embodiment (FIG. 6)

A fiber reinforced structural member D, in a fifth embodiment, according to the present invention comprises: a shell element $13d$ formed of a fiber reinforced material such as, for example, a FRP, and having a closed cross section; and a core element $d_2$ comprising a primary core element $d_1$ formed by filling a filling material $12d$ such as, for example, foam polyurethane, in a channel-shaped elongate core member $11d$ formed of a fiber reinforced material, and a core strip $15b$ formed of a synthetic resin such as, for example, foam polyurethane, and attached to the outer surface of the bottom wall of the channel-shaped elongate core member $11d$. The core element $d_2$ is inserted in the shell element $13d$, and then the core element $d_2$ and the shell element $13d$ are fixedly joined over the entire contact surface thereof to form the fiber reinforced structural member D.

In accordance with the present invention, there have been described fiber reinforced structural members in preferred embodiments, from which it is apparent that (a) the core element and the shell element are in contact with each other with a large contact surface extending over the entire inner surface of the shell element and hence an external force applied to the fiber reinforced structural member is distributed over the entire joining surface, so that stress in the joining surface is reduced and the reliability of the fiber reinforced structural member is enhanced;

(b) the primary core element and the core strip or strips of the core element are joined over a large joining surface and an external force acting on the core element is distributed over the entire joining surface, and hence the stress in the joining surface is reduced, so that the reliability of the fiber reinforced structural member is enhanced; and (c) the primary core element or elements and the shell element are lightweight members formed of a fiber reinforced material such as, for example, a FRP, and hence the weight per unit strength of the fiber reinforced structural member is small, which is advantageous for the structural member.

Although the present invention has been described with reference to preferred embodiment thereof with a certain degree of particularity, it is understood that the foregoing embodiments are merely illustrative of the application of the principles of the present invention and many changes and variations are possible in the invention without departing from the scope and spirit thereof.

What is claimed is:

1. A structural member, comprising:
   a shell element having a closed cross-section;
   a plurality of core elements disposed internally within said shell element, each of said core elements having a closed cross-section with at least one side surface thereof united to said shell element and at least one side surface thereof united to another one of said core elements whereby load and impact forces impressed upon said structural member can be distributed throughout said shell and core elements; and
   filling material disposed internally within said core elements.

2. A structural member as set forth in claim 1, wherein:
   said structural member comprises an elongated structural beam.

3. A structural member as set forth in claim 2, wherein said structural beam member comprises:
   bearing pads disposed upon opposite ends of said structural beam member; and
   a load bearing member located at a central portion of said structural beam member for supporting external loads applied to said structural beam member.

4. A structural member as set forth in claim 1, wherein:
   said shell and core elements are formed from a fiber reinforced material.

5. A structural member as set forth in claim 4, wherein:
   said fiber reinforced material is a fiber reinforced plastic (FRP).

6. A structural member as set forth in claim 1, wherein:
   said shell element has a substantially square-shaped configuration in cross-section while said core elements have a substantially rectangular configuration in cross-section.

7. A structural member as set forth in claim 6, wherein:
   two core elements are disposed internally within said shell element.

8. A structural member as set forth in claim 6, wherein:
three core elements are disposed internally within said shell element.

9. A structural member as set forth in claim 15, wherein:
said filling material comprises foam polyurethane.

10. A structural member as set forth in claim 1, wherein:
said filling material comprises foam polyurethane.

11. A structural member as set forth in claim 1, wherein:
said plurality of core elements comprise two core elements disposed in a single aligned row.

12. A structural member as set forth in claim 1, wherein:
said plurality of core elements comprise three core elements disposed in a single aligned row.

13. A structural member as set forth in claim 1, wherein:
said plurality of core elements comprises two core elements; and
the volume of said two core elements is substantially equal to the interior volume of said shell element.

14. A structural member as set forth in claim 1, wherein:
said plurality of core elements comprises three core elements; and
the volume of said three core elements is substantially equal to the interior volume of said shell element.

15. A structural member, comprising:
a shell element having a closed cross-section;
a plurality of closed cross-section core elements, disposed internally within said shell element in a serial array, united to each other in said serial array and with at least end ones of said core elements of said serial array also being united to said shell element whereby load and impact forces impressed upon said structural member can be distributed throughout said shell and core elements; and
filling material disposed internally within said core elements.

16. A structural member as set forth in claim 15, wherein:
said shell and core elements are fabricated from a fiber reinforced material.

17. A structural member as set forth in claim 16, wherein:
said fiber reinforced material is a fiber reinforced plastic (FRP).

18. A structural member as set forth in claim 15, wherein:
said shell element has a substantially square-shaped configuration in cross-section while said core elements have a substantially rectangular configuration in cross-section.

19. A structural member as set forth in claim 18, wherein:
two core elements are disposed internally within said shell element.

20. A structural member as set forth in claim 18, wherein:
three core elements are disposed internally within said shell element.

21. A structural member as set forth in claim 15, wherein:
said structural member comprises an elongated structural beam.

22. A structural member as set forth in claim 21, wherein said structural beam member comprises:
bearing pads disposed upon opposite ends of said structural beam member; and
a load bearing member located at a central portion of said structural beam member for supporting external loads applied to said structural beam member.

23. A structural member as set forth in claim 15, wherein:
said serial array is a one-by-two array with said core elements extending one core element thickness in a first direction and extending two core element thicknesses in a second orthogonal direction.

24. A structural member as set forth in claim 15, wherein:
said serial array is a one-by-three array with said core elements extending one core element thickness in a first direction and extending three core element thicknesses in a second orthogonal direction.

25. A structural member as set forth in claim 15, wherein:
said plurality of core elements comprises two core elements; and
the volume of said serial array of said core elements is substantially equal to the interior volume of said shell elements.

26. A structural member as set forth in claim 15, wherein:
said plurality of core elements comprises three core elements; and
the volume of said serial array of said core elements is substantially equal to the interior volume of said shell element.

* * * * *